Aug. 28, 1962    A. A. ROOT    3,051,035
FLEXIBLE PYROSCOPES
Filed May 17, 1960
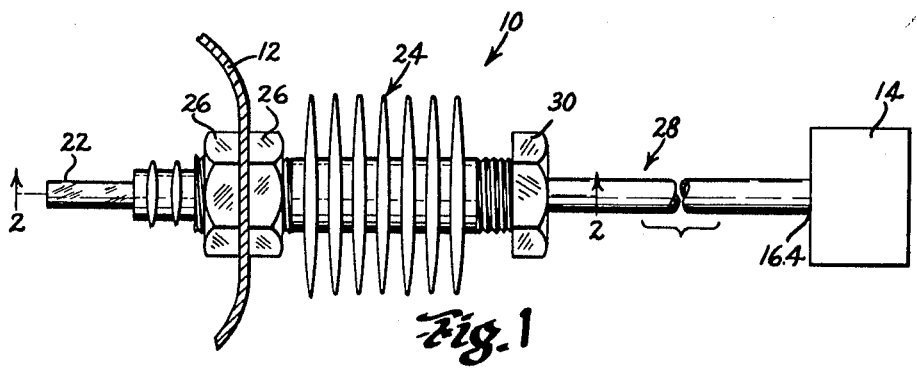
Fig. 1
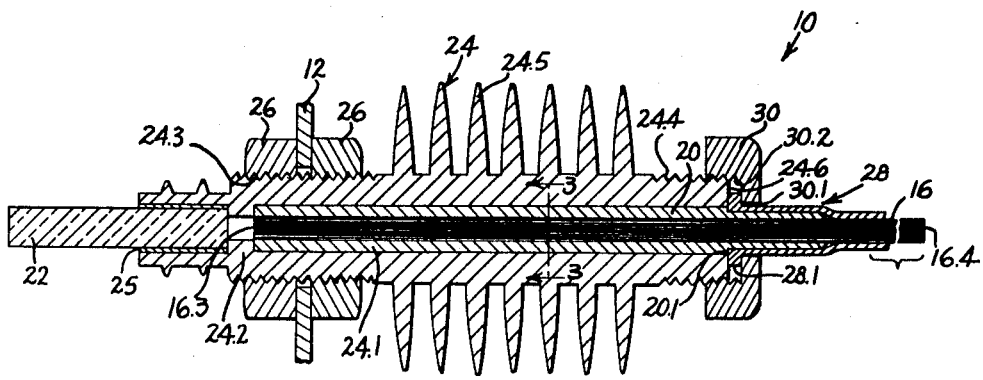
Fig. 2
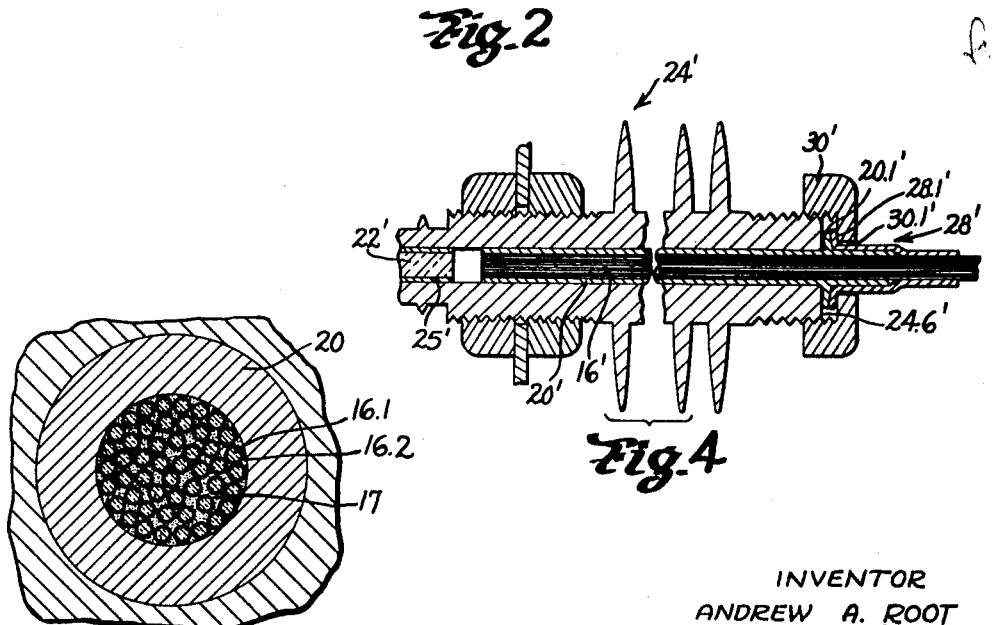
Fig. 3
Fig. 4
INVENTOR
ANDREW A. ROOT
BY
ATTORNEYS //
United States Patent Office 3,051,035
Patented Aug. 28, 1962

3,051,035
FLEXIBLE PYROSCOPES
Andrew A. Root, Shrewsbury, Mass., assignor to American Optical Company, Southbridge, Mass., a voluntary association of Massachusetts
Filed May 17, 1960, Ser. No. 29,699
4 Claims. (Cl. 88—1)

The field of this invention is that of pyroscopes and the invention relates more particularly to flexible pyroscopes which are adapted to provide efficient transmission of light from areas of high temperature and which are adapted to withstand extreme moisture conditions.

In the operation of flame detection apparatus in aircraft, for example in utilizing devices for detecting the occurrence of fires in aircraft and in using devices for sensing flame-out situations in aircraft jet engines, means must be provided for conducting light along a tortuous path from a point close to or even within a flame or area of high temperature to flame detection devices which are located relatively remote from the high temperature areas, and in order for such devices to be accurately and rapidly responsive to the presence of or variations in the intensity of a flame, the light-conducting means must function with a high degree of efficiency. Further, since aircraft will be operated at various altitudes so that substantial water vapor condensation will occur within the aircraft, light-conducting means provided for the above-described applications must be adapted to withstand extreme moisture conditions.

It is an object of this invention to provide a pyroscope or light-conducting means of high efficiency which is adapted to withstand extremely high temperatures, and to provide such a pyroscope which is adapted to withstand extreme moisture conditions.

It is a further object of this invention to provide a flexible pyroscope which is adapted to be inserted within flames of high temperature and to transmit light efficiently along a tortuous path from within the flames to points remote from the flames.

It is an additional object of this invention to provide a pyroscope of the above-described characteristics which is inexpensive to manufacture and install.

Another object of this invention is to provide a pyroscope having a flexible light-conducting member of relatively high heat-resistance coupled with a light-conducting member of relatively high light-conducting efficiency to form a single, substantially continuous light channel, thereby to permit efficient transmission of light from an area of high temperature to a point remote from the high temperature area.

A principal object of this invention is to provide such a pyroscope having a light-conducting member of relatively high efficiency coupled with a light-conducting member of relatively high heat-resistance which forms a hermetically sealed unit capable of withstanding extreme moisture conditions.

Other objects, advantages and details of construction of the pyroscope provided by this invention will appear in the following detailed description of preferred embodiments of the invention, the description referring to the drawing in which:

FIG. 1 is a side elevation view of the pyroscope provided by this invention;
FIG. 2 is a section view along line 2—2 of FIG. 1;
FIG. 3 is a section view to enlarged scale along line 3—3 of FIG. 2; and
FIG. 4 is a partial section view similar to FIG. 2 showing an alternative embodiment of a pyroscope according to this invention.

Referring to the drawing, 10 in FIG. 1 indicates the pyroscope provided by this invention which is shown mounted upon the wall of the combustion chamber of an aircraft jet engine, as indicated at 12, and which is adapted to transmit light from within the combustion chamber to a flame detection device diagrammatically illustrated at 14, thereby to permit sensing of a flame-out situation within the combustion chamber if such should occur. However, it should be understood that the pyroscope provided by this invention is adapted for use in various other applications where pyroscopes are conventionally utilized.

As shown in FIGS. 2 and 3, the pyroscope includes a light-conducting member 16 of high light-conducting efficiency. This member may be flexible and may comprise a single light-conducting element of glass or plastic, but preferably comprises a multiplicity of light-conducting glass or plastic fibers 16.1 which are disposed in side-by-side bundled relation, each fiber initially having a light-insulating glass or plastic coating 16.2, the fibers most advantageously being composed of glass such as flint glass having a high index of refraction and the coatings being composed of glass such as crown glass having a low index of refraction. The fiber coatings may be fused together either at the ends of the fiber bundle or throughout the length of the fiber bundle for forming an integral light-conducting member, or the fibers may be interconnected at the bundle ends only with a suitable adhesive such as an epoxy resin, as at 17, for providing a light-conducting member of high efficiency and flexibility. Preferably, the ends 16.3 and 16.4 of the fiber bundle are optically finished for readily receiving light therein or the transmission of light therethrough. A sleeve 20 of brass or other suitably rigid and strong material which may include sleeves of heat-insulating materials is secured around the flexible member 16 adjacent one end 16.3 thereof, for example, by a conventional shrinking process or by means of an epoxy resin adhesive, the sleeve having a radially extending shoulder 20.1 which faces away from the flexible member end 16.3.

The pyroscope also includes a light-conducting member of high heat-resistance such as a rod of fused quartz, quartz fibers or fused sapphire. Such a rod may transmit light with relatively low efficiency, but is adapted to withstand the extremely high temperatures such as might be found within the combustion chamber of an aircraft jet engine, a quartz rod maintaining its light-transmitting characteristics at temperatures exceeding 2000° F. and a sapphire rod being suitable for use in temperatures exceeding 3400° F.

A coupling 24 of brass, stainless steel or other suitable material having characteristics of strength and relatively high thermal conductivity is provided for securing the light-conducting members 16 and 22 in sequence to form a substantially continuous light channel therethrough. The coupling has a through bore or passage 24.1 and has an inner annular portion 24.2 within the passage for dividing the passage to receive the adjacent ends of the light-conducting members 16 and 22 therein. The coupling also has externally threaded portions 24.3 and 24.4, one of which, as at 24.3, is adapted for threaded engagement with jam nuts 26 to mount the pyroscope on the wall of the combustion chamber 12. However, it should be understood that flange means or other suitable means may be provided on the coupling for mounting the pyroscope in any conventional manner within the scope of this invention. A plurality of fins or ribs 24.5 are also provided on the coupling for radiating heat therefrom, whereby the coupling is adapted for rapidly dissipating heat transferred thereto from within the combustion chamber 12.

The quartz rod 22 or other light-conducting member of high heat-resistance is fitted within the coupling passage in abutting engagement with the annular portion 24.2 and is secured therein in heat-transferring relation to the coupling with a suitable heat-resistant adhesive 25, the adhesive forming a hermetical seal between the rod and coupling. Preferably, the adhesive comprises a sauereisen cement which does not tend to wet the quartz rod and therefore does not substantially reduce the light-transmitting capabilities of the rod. Such a cement is satisfactorily heat-resistant and provides a suitable bond between the quartz rod and the metallic coupling which will not be broken as the bond is subjected to a wide range of temperatures even though the rod and coupling may have substantially different coefficients of thermal expansion. Further, such an adhesive does not substantially interfere with the heat-transfer between the rod and coupling.

As shown in FIG. 2, the end 16.3 of the flexible member 16 is also fitted within the coupling passage so that the end of the sleeve 20 abuts the annular portion 24.2 and so that the shoulder 20.1 of the protecting sleeve is aligned with the end 24.6 of the coupling.

A thin tube 28 of strong but flexible material such as stainless steel is fitted over the flexible member 16, the tube having a flanged end 28.1 which is adapted to abut both the protecting sleeve shoulder 20.1 and the end 24.6 of the coupling. A clamp means such as the threaded cap 30, preferably having a hexagonal shape adapted to be gripped by conventional wrench means, has a central aperture 30.1 fitted over the tube 28 in engagement with the tube end flange 28.1 and has a threaded portion 30.2 threadedly engaged with the coupling, as at 24.4, for drawing the tube firmly against the sleeve shoulder 20.1 and the coupling end 24.6 to secure the flexible member 16 within the coupling and to form a hermetical seal between the tube flange and the coupling. As will be readily understood, the opposite end of the tube 28 which is connected to the fire detecting device 14 at a point remote from the high temperatures within the combustion chamber 12 can be hermetically sealed to the device 14 in any conventional manner.

In this construction, as shown in FIG. 1, the pyroscope can be mounted on the wall of a jet engine combustion chamber, as at 12, so that the light-conducting rod 22 is bathed in flame within the chamber. Since the rod 22 is composed of a material having high heat-resistance, the rod will maintain its light-transmitting characteristics even though bathed in flame within the combustion chamber and will conduct light to the flexible member 16. The coupling being of a material of high thermal conductivity is adapted to rapidly conduct heat away from the rod and to dissipate heat transferred thereto from the rod, whereas the rod, which is a relatively poor conductor of heat, is separated from direct contact with the flexible member 16 so that only a relatively small part of the heat to which the rod is exposed will be directed upon the flexible member 16. Since the flexible member, if composed of the glass materials above described, is capable of withstanding temperatures of close to 1000° F. without substantial reduction of its high light-conducting efficiency, it has been found that the rod 22 selected for its high heat resistance despite its low light-conducting efficiency can be held to minimal length in this combination while still providing adequate insulation of the flexible member 16 from the high temperatures in the combustion chamber 12. Thus, the pyroscope according to this invention has excellent heat-resistant characteristics while providing highly efficient light transmission.

Further, the disclosed means for clamping the flexible member 16 within the coupling passage and for clamping the tube enclosing the flexible member provide a hermetical seal for the flexible member which protects the flexible member from the harmful effects of the extreme moisture conditions which are found in modern aircraft, but which permits convenient interchanging of flexible members of various lengths within the pyroscope. It has also been found that spacing of the rod 22 and the flexible member 16 permits thermal expansion of the various pyroscope components without disturbing the effectiveness of such hermetical seals.

In FIG. 4, there is illustrated an alternative embodiment of the pyroscope provided by this invention which is adapted to provide superior hermetical sealing of the flexible member. In description of this embodiment, it should be noted that members corresponding to members incorporated in the previously described embodiment are identified by corresponding, primed numbers. In the alternative embodiment, the flexible member 16' has a protective sleeve 20' which is provided with a radially extending flange 20.1' having a slightly tapered surface inclined toward the coupling member 24', and the tube 28' has a flanged end 28.1' of a configuration corresponding to the sleeve flange. In this construction, tightening of the clamp means 30' is adapted to draw the sleeve flange 28.1' against the coupling end 24.6' to secure the flexible member to the coupling 24' without requiring an inner annular portion, such as at 24.2 in FIG. 1, in the coupling passage 24.1' while still providing a more effective hermetical seal between the tube 28' and the coupling 24'. The rod 22' of high heat-resistance is, however, sealed to the coupling 24' in spaced relation to the flexible member 16' by means of a suitably heat-resistant cement 25' such as previously mentioned in connection with the structure of FIGS. 1 and 2.

Although particular embodiments of this invention have been described for the purposes of illustration, it should be understood that this invention includes all modifications and equivalents thereof which fall within the scope of the appended claims.

Having described the above invention, I claim:

1. A flexible light-transmitting device comprising a light-conducting member of relatively high efficiency said member embodying a multiplicity of light-conducting glass fibers disposed in side-by-side bundled relation, said fibers having respective light-insulating glass coatings; a light-conducting member of relatively high heat resistance; and coupling means securing said members in sequence and in spaced relation to provide a substantially continuous light channel therethrough, said coupling means being secured in heat-transferring relation to said member of high heat-resistance and having external fin means adapted to radiate heat transferred thereto from said member of high heat resistance, said member of high heat-resistance being of minimum selected length for cooperating with said member of high light-conducting efficiency to permit extension of said light channel from an area of high temperature while spacing said member of high light-conducting efficiency a minimum selected distance from said area of high temperature for shielding said member of high light-conducting efficiency from the harmful effects of said high temperature.

2. A pyroscope device comprising a flexible light-conducting member embodying a multiplicity of light-conducting glass fibers disposed in side-by-side bundled relation, said fibers having respective light-insulating glass coatings; rigid sleeve means fixedly secured around a portion of said flexible member adjacent one end for protecting said member end, said sleeve means having a radially extending shoulder facing toward the other end of said member; a light-conducting member of relatively high heat-resistance; a coupling having a through passage divided by an annulus into which said rigid sleeve and a portion of said member of high heat resistance are inserted from respective ends for securing said light-conducting members in sequence to provide a substantially continuous light channel therethrough, said coupling having external fin means adapted to radiate heat from said coupling; means hermetically sealing said member of high heat-resistance fixedly within the coupling passage in heat-transferring relation to said coupling; a flexible tube of waterproof material having a flanged end fitted over said flexible member with said flanged end in abutting engagement with said coupling and with the shoulder of said sleeve means; and clamp means fitted over said flanged tube end and threadedly engaged with said coupling for drawing the tube against said coupling and shoulder to detachably secure the flexible member within said passage and to provide hermetical sealing between the tube and coupling.

3. A pyroscope device as set forth in claim 2 wherein the means producing the hermetic seal comprises heat-resistant sauereisen cement which is adapted to adhere to said member of high heat-resistance without wetting said member.

4. A pyroscope comprising a flexible light-conducting member embodying a multiplicity of light-conducting glass fibers disposed in side-by-side bundled relation, each of said fibers comprising a core of glass of a relatively high index of refraction having a light-insulating glass coating thereon of a relatively low index of refraction; a protecting sleeve secured around the flexible member adjacent one end thereof, said sleeve having a radially extending flange spaced from said member end; a rod of heat resistant light-conducting material; a metallic coupling having a through passage receiving respective adjacent aligned end portions of said rod and sleeve to provide a substantially continuous light channel therethrough, said coupling having spaced circumferentially disposed fin means adapted for radiating heat therefrom; means for fixedly securing said rod portion within the coupling passage in hermetically sealed, heat-transferring relation; a flexible tube of waterproof material having a flanged end fitted over the flexible member in abutting engagement with the protecting sleeve flange; and clamp means fitted over said tube in abutting engagement with said flanged tube end and threadedly engaged with the coupling for drawing the tube flange and sleeve flange against the coupling to detachably secure said sleeve portion within the coupling passage in a hermetically sealed attachment.

References Cited in the file of this patent
UNITED STATES PATENTS

| | | |
|---|---|---|
| 2,113,450 | Lasky et al. | Apr. 5, 1938 |
| 2,295,045 | Mettler | Sept. 8, 1942 |
| 2,567,036 | Shannon | Sept. 4, 1951 |
| 2,825,260 | O'Brien | Mar. 4, 1958 |